(No Model.)
F. ANSLEY.
STRAINER FOR MILK PAILS.
No. 603,673. Patented May 10, 1898.
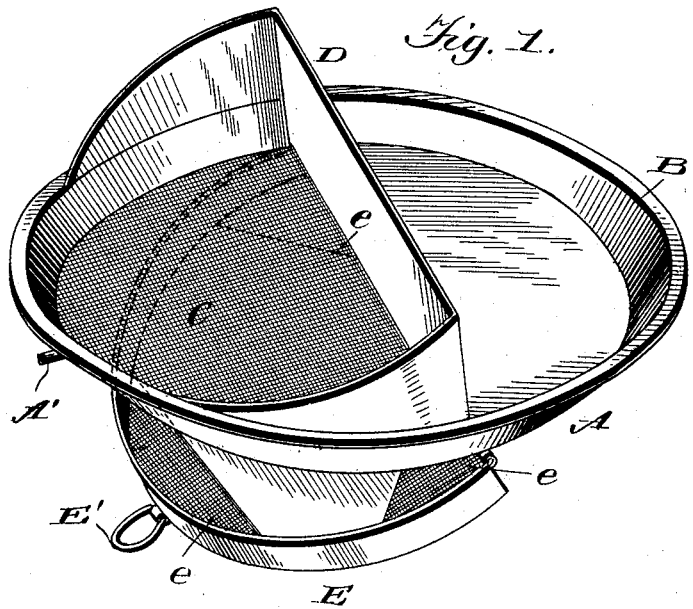
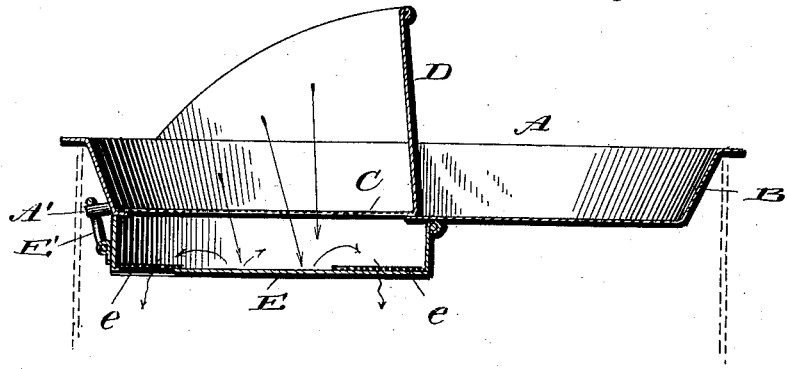
Witnesses:
L. C. Hills.
A. L. Hough.
Inventor:
Frank Ansley,
by Franklin H. Hough
Atty.
THE NORRIS PETERS CO., PHOTO-LITHO., WASHINGTON, D. C.

UNITED STATES PATENT OFFICE.

FRANK ANSLEY, OF MEDICAL LAKE, WASHINGTON.

STRAINER FOR MILK-PAILS.

SPECIFICATION forming part of Letters Patent No. 603,673, dated May 10, 1898.

Application filed July 19, 1897. Serial No. 645,084. (No model.)

*To all whom it may concern:*

Be it known that I, FRANK ANSLEY, a citizen of the United States, residing at Medical Lake, in the county of Spokane and State of Washington, have invented certain new and useful Improvements in Strainer-Tops for Pails; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in tops or strainers for milk-pails; and the object of my invention is to generally improve upon the constructions of milk-pails heretofore already secured by Letters Patent, and particularly upon my prior patent, No. 475,375, which was issued to me for an improvement in milk-pails.

In carrying out my invention it is my purpose to construct a tray having beveled edges, whereby the same may be fitted to different-sized pails, a large proportion, preferably one-half, of the bottom surface of the said tray being formed of a screen having suitable guard-pieces extending about portions of the edges of the screen, whereby the milk may be deflected onto the screen, through which it passes into the pail.

A further part of the invention resides in the provision of a tray of the character described to the under solid portion of which is hinged a supplemental tray which is of a size sufficiently large to cover a space occupied by the screen in the tray and located directly beneath the said screen, the said supplemental hinged tray having a number of small screens located at the corners and outer edges thereof, whereby milk as it passes through the large screen in the tray is allowed to strike the solid portion of the supplemental tray, whereby the force of the milk is broken and the liquid allowed to gently flow through the small screens in the supplemental tray into the pail beneath, thus avoiding the forming of froth on the surface of the milk, at the same time preventing any possibility of hair or foreign matter getting into the contents thereof.

To these ends and to such others as the invention may pertain the same consists, further, in the novel construction, combination, and adaptation of the parts, as will be hereinafter more fully described, and then specifically defined in the appended claim.

The invention is clearly illustrated in the accompanying drawings, which, with the letters of reference marked thereon, form a part of this application, and in which drawings—

Figure 1 is a perspective view of my improved top for milk-pails, showing the supplemental tray held to the upper screen-carrying tray. Fig. 2 is a sectional view of the supplemental tray hinged to the upper tray, the latter being shown in section.

Reference being had to the details of the drawings by letter, A designates the tray, which has a beveled edge B, whereby the same may be fitted easily to different-sized pails. One-half of the bottom of the said tray is cut away, and in the opening formed therein is suitably attached the screen C. About the straight edge of the said screen and the curved corner adjacent thereto is a guard D, which extends, preferably, in the position shown in the drawings, with the sides flaring outwardly somewhat, in order to deflect the stream of milk onto the said screen. A suitable space is left between the ends of the said guards, whereby milk may be poured out of the pail, if desired, and to the under side of the said tray is pivoted a supplemental tray E, the said supplemental tray being of such a size as to completely cover the entire space beneath the screen in the tray A. At the corners of the supplemental tray and at its outer edge are the small screens *e*, through which the milk is allowed to flow into the receptacle beneath. To the outer edge of the said supplemental tray is an eye E', which is provided to lock the said tray to the tray A by means of the said eye engaging over a lug A' on the tray A. When the two trays are locked together, as described, it will be observed that underneath the main portion of the large screen is the solid portion of the under or supplemental tray, and against which the force of the milk is broken as it passes through the upper screen, and is thence allowed to flow through the smaller screens in the supplemental tray by gravity alone, thus preventing any froth on the surface of the milk contained within the pail. By this construction any foreign matter, as hair or other particles, are prevented from passing through into the pail beneath. When it is desired to cleanse the under tray, the same may be detached and allowed to swing down, thus giving access to its upper surface.

Having thus described my invention, what I claim to be new, and desire to secure by Letters Patent, is—

A removable tray and strainer for milk-pails, comprising in combination with the tray proper, having a screen located in the bottom thereof and a guard about the same, a supplemental cooling-tray E, having a centrally imperforated portion, the screen-openings E about the outer margin of said tray E, which tray is pivoted to the under side of the tray proper, the eye E' pivoted to the free swinging edge of the said tray E, and the pin A' for engagement with said eye, whereby the bottoms of the trays may be held parallel to each other with a slight space intervening between same, substantially as and for the purpose set forth.

In testimony whereof I affix my signature in presence of two witnesses.

FRANK ANSLEY.

Witnesses:
EMILY HALLETT,
STANLEY HALLETT.